Patented Jan. 30, 1951

2,539,871

UNITED STATES PATENT OFFICE 2,539,871

METHOD TO PREPARE SOLUTIONS OF GASES

Tor Halfdan Smedslund, Helsingfors, Finland, assignor to Aktiebolaget Centrallaboratorium, Helsingfors, Finland No Drawing. Application July 17, 1945, Serial No. 605,635. In Sweden July 18, 1944

2 Claims. (Cl. 252—1)

This invention relates to a method of preparing solutions of gases, e. g. solutions of acetylene, sulphur dioxide and other gases for storage and transport. The chief characteristic of the invention is that the gas is brought into contact with a liquid or substance that contains dimethyl sulphoxide as a solvent for the gas.

Dimethyl sulphoxide obtained e. g. on oxidation of dimethyl sulphide, a by-product in the sulphate cellulose industry, has proved to possess a surprising property to dissolve large quantities of various gases. Thus the solubility of acetylene in dimethyl sulphoxide is greater than in acetone. Moreover, compared to acetylene dimethyl sulphoxide has that advantage that it evaporates less easily because of its relatively high boiling point, and thus eventual losses of liquid are reduced and the technical handling is simplified. Dimethyl sulphoxide can also be used mixed with acetone or some other known solvent for gases.

Besides acetylene dimethyl sulphoxide also dissolves sulphur dioxide and a number of other gases.

Having now particularly described the nature of my invention and the manner of its operation what I claim is:

1. As a composition of matter, dimethyl sulfoxide containing acetylene dissolved therein.
2. As a composition of matter, a homogeneous solution of dimethyl sulfoxide and acetone containing acetylene dissolved therein.

TOR HALFDAN SMEDSLUND.

REFERENCES CITED

The following references are of record in the file of this patent:

UNITED STATES PATENTS

| Number | Name | Date |
|---|---|---|
| 2,139,000 | Cohen | Dec. 6, 1938 |
| 2,365,898 | Morris et al. | Dec. 26, 1944 |

OTHER REFERENCES

Hantzsch, Ber. der Deu. Chem., 40, p. 1514 (1907).

Steinkopf, Ber. der Deu. Chem., 56, p. 1929 (1923).

Walden, Chem. Zentralblatt, 96, I p. 1674 (1925).